Nov. 26, 1968     F. L. HERBSTHOFER     3,412,672
SPLASH-PROOF INLET DRAWER FOR WATER HEATER
Filed May 26, 1967     2 Sheets-Sheet 1
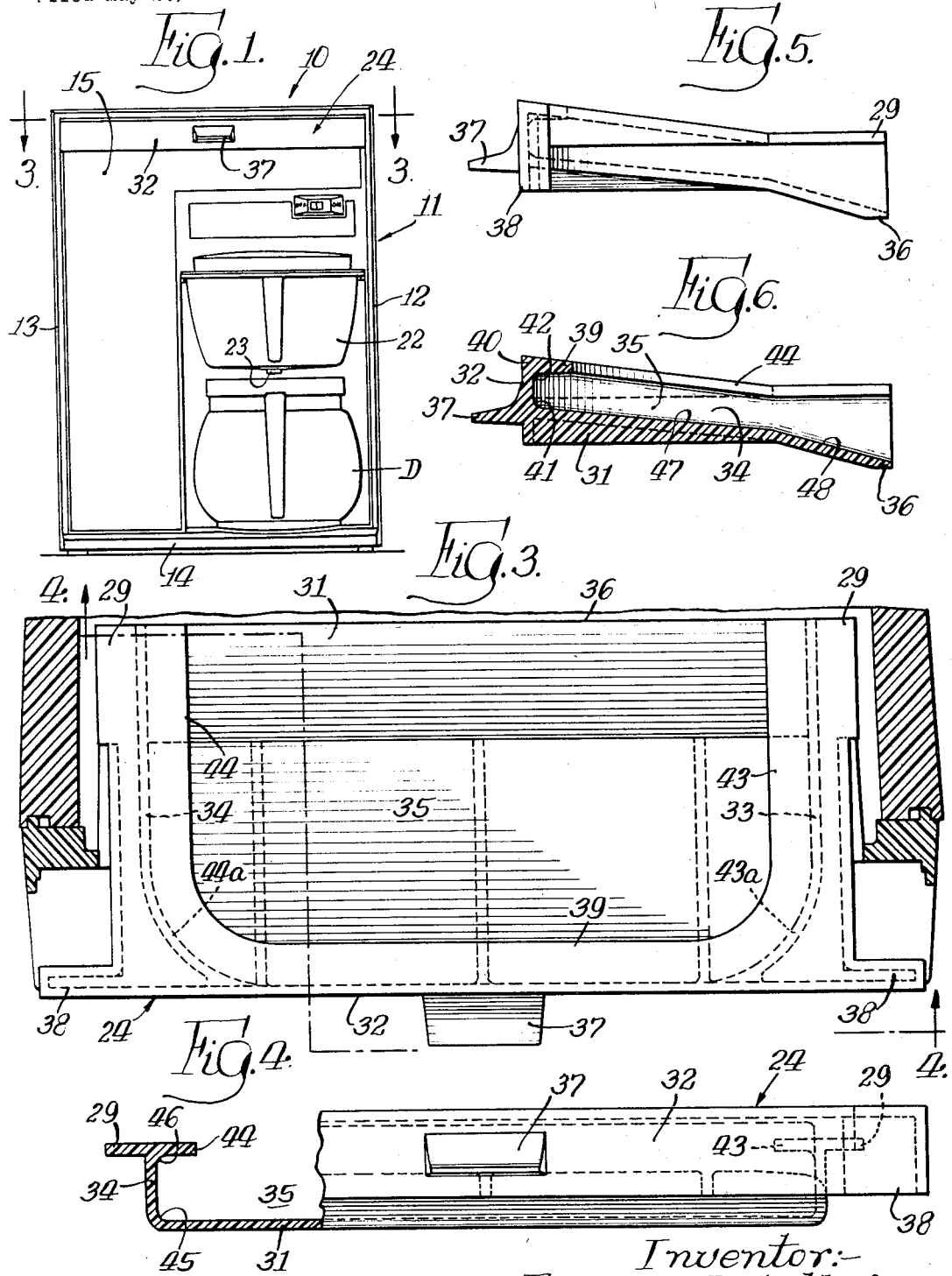
Inventor:-
Franz L. Herbsthofer
By Hofgren, Wegner, Allen,
Stellman & McCord Attys.

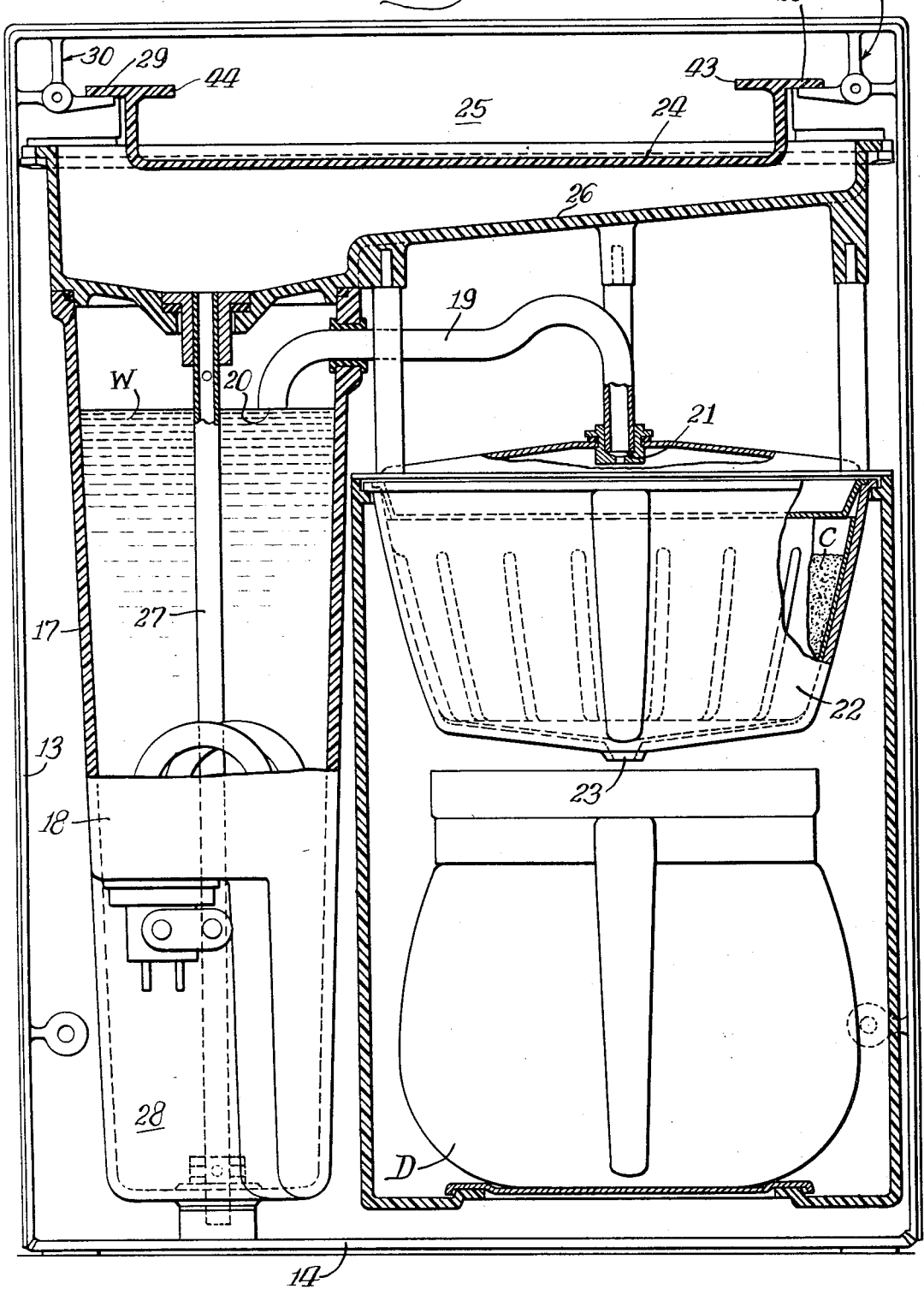

United States Patent Office 3,412,672
Patented Nov. 26, 1968

3,412,672
SPLASH-PROOF INLET DRAWER FOR
WATER HEATER
Franz L. Herbsthofer, Evanston, Ill., assignor to
Cory Corporation, a corporation of Delaware
Filed May 26, 1967, Ser. No. 641,520
10 Claims. (Cl. 99—300)

ABSTRACT OF THE DISCLOSURE

Apparatus for conducting poured water to an inlet receiver of a hot water heating tank. The apparatus is defined by a shallow drawer having an inturned flange extending partially about the periphery thereof for effectively preventing undesirable outward splashing of the poured water. The hot water heater may be used in a coffee brewing apparatus.

---

This invention relates to hot water heating means and in particular to pour-through type hot water heating means such as for use in a brewing apparatus.

In one known form of brewing apparatus, water is heated in a suitable heating tank to a preselected brewing temperature such as 200° F. A basin is provided at the top of the tank for receiving cold water and is provided with an inlet tube extending downwardly therefrom to adjacent the bottom of the tank for delivering the cold water thereto. An open-to-atmosphere outlet is provided at the top of the tank whereby the cold water entering the tank displaces a corresponding quantity of hot water outwardly through the outlet such as to a suitable beverage brewing cartridge.

In such pour-through brewers, it is desirable to enclose the apparatus in a suitable housing. Such enclosure presents the problem of providing access to the basin for pouring the cold water thereinto as discussed above. In one improved form of such brewing apparatus, as disclosed in copending Karlen and Lockett United States patent application Ser. No. 499,306, filed Oct. 21, 1965, now Patent No. 3,366,034, and owned by the assignee hereof, a pour-through apparatus of the above discussed type is provided with a tray, or drawer, which is selectively movable to have a portion thereof disposed outwardly of the housing to receive the poured water and conduct it into the subjacent basin within the housing, and retractable into the housing to effectively close the upper delivery portion of the housing when delivery of the cold water is not being effected. The present invention comprehends an improved tray, or drawer, structure having novel means for effectively precluding the splashing of the poured water forwardly from the drawer during the delivery operation.

Thus, a principal feature of the present invention is the provision of a new and improved brewing apparatus.

Another feature of the invention is the provision of such a brewing apparatus having a shallow drawer for delivering cold water poured thereinto to the tank basin provided with new and improved means for effectively precluding splashing of the poured water forwardly from the drawer during the delivery operation.

A further feature of the invention is the provision of such a brewing apparatus wherein the splash preventing means comprises improved baffle means on the front wall of the drawer spaced above the bottom wall thereof and extending rearwardly from the front wall.

A further feature of the invention is the provision of such a brewing apparatus wherein the splash preventing means further includes improved baffle means on the side walls.

A yet further feature of the invention is the provision of such a brewing apparatus wherein the splash preventing means further includes a rearwardly, downwardly inclined bottom wall portion.

Another feature of the invention is the provision of such a brewing apparatus wherein the splash preventing means further includes means defining a concave rounded connection between the bottom wall and the front and side walls.

Still another feature of the invention is the provision of such a brewing apparatus wherein the baffle means has a preselected minimum extension from the associated upstanding wall.

A further feature of the invention is the provision of such a brewing apparatus wherein the front wall and side wall baffle means comprises a continuous inturned flange on the upper edge of the front and side walls.

Other features and advantages of the invention will be apparent from the following description taken in connection with the accompanying drawing wherein:

FIGURE 1 is a front elevation of a brewing apparatus having means for conducting poured water to the water heating tank embodying the invention;

FIGURE 2 is a vertical section thereof;

FIGURE 3 is a top plan view of the drawer means;

FIGURE 4 is a front elevation thereof with a portion broken away for facilitating illustration thereof;

FIGURE 5 is a side elevation thereof; and

FIGURE 6 is a vertical section thereof taken substantially along the line 6—6 of FIGURE 3.

In the exemplary embodiment of the invention as disclosed in the drawing, a brewing apparatus generally designated 10 is shown to comprise a housing 11 having side walls 12 and 13, bottom wall 14, front wall 15, and a rear wall 16. The brewing apparatus includes a hot water tank 17 having suitable electrical heating means 18 associated therewith for heating water W in the tank to a preselected temperature such as approximately 200° F. Hot water is conducted outwardly from the tank through a gooseneck siphon outlet 19 having an inner end 20 within the tank 17 and an outlet fitting 21 at the outer end for delivering water to a suitable brewing cartridge 22 in which the beverage ingredients C are provided. The hot water flowing through the cartridge 22 passes downwardly therefrom through an opening 23 into a suitable receiver, such as decanter D.

Apparatus 10 is of the pour-through type wherein cold water is introduced into the tank 17 for displacing hot water through the outlet 19. More specifically, cold water may be poured into a drawer 24 movably received in an upper portion 25 of the interior of the housing 11 and conducted therefrom into a basin 26 provided with a depending inlet tube 27 extending from the bottom of the basin to a lower portion 28 of the heating tank. As best seen in FIGURE 2, the drawer 24 includes side flanges 29 slidably received on brackets 30 carried by the housing 11 for selective disposition of the drawer in the fully retracted position within the housing, as shown in FIGURE 1, and a delivery position (not shown) wherein the drawer is moved partially outwardly therefrom.

Referring now more specifically to FIGURES 3 through 6, drawer 24 is shown to comprise a shallow device having a bottom wall 31, a front wall 32, right side wall 33, and left side wall 34. Walls 31 through 34 cooperatively define a rearwardly opening water receiving space 35 into which the cold water may be poured as from the decanter D. In the delivery position, the rear edge 36 of the bottom wall 31 is disposed generally above the mid-portion of the basin 26 whereby water falling from the rear of the tray is received by the basin and conducted therefrom downwardly through the inlet tube 27 into tank 17. The inward and outward movement of the drawer 24 may be effected manually by means of a front handle 37. The front wall 32 may include laterally extending side wing portions 38 to permit the front wall to extend fully across the housing, as shown in FIGURE 1.

As indicated above, drawer 24 is provided with new and improved means for effectively precluding the splashing forwardly from the drawer of the water being poured thereinto. More specifically, in the illustrated embodiment, the splash preventing means comprises a baffle 39 on the front wall 32 spaced above the bottom wall 31 and extending rearwardly therefrom to define an inturned flange. As seen in FIGURE 6, the baffle 39 extends from the top edge 40 of the front wall 32. To further prevent splashing of the poured water, the drawer is provided with a first concave rounded rearwardly facing connection 41 between the bottom wall 31 and the front wall 32, and a second concave rounded rearwardly facing connection 42 between the front wall 32 and the baffle 39 whereby water flowing forwardly along the bottom wall 31 is redirected firstly by connection 41 forwardly along the rear face of the front wall 32 and then by the connection 42 rearwardly along the underside of the baffle 39 back into space 35 for delivery therefrom over the rear edge 36 into the basin 26. As shown in FIGURE 6, the baffle 39 has a rearward extent approximately equal to the upward extent of the front wall 32. Further, the baffle 39 has a rearward extent of approximately 10% of the depth of the bottom wall 31, as best seen in FIGURE 3.

Referring now more specifically to FIGURE 3, the splash preventing means further includes a second baffle 43 on right side wall 33 and a third baffle 44 on left side wall 34. As shown, the baffles 43 and 44 comprise integral extensions of baffle 39 and, thus, define inturned flanges at the top of the side walls 33 and 34 functioning in the same manner as flange baffle 39.

As shown in FIGURE 4, the splash preventing means may further include a concave rounded inwardly facing connection 45 between the bottom wall 31 and the side wall, e.g. side wall 34 for directing water moving laterally outwardly along the drawer side wall, and a concave rounded inwardly facing upper connection 46 between the side wall, e.g. side wall 34, and the baffle, e.g. baffle 44, for directing the water moving upwardly along the side wall inwardly along the underside of the flange and back into space 35. Preferably, the flanges 43 and 44 extend at least approximately 5% of the width of the bottom wall 31.

Still further, the splash preventing means includes rearwardly, downwardly inclined upper surfaces 47 and 48 on the bottom wall 31, an best seen in FIGURE 6. Thus, water splashing forwardly from the bottom wall is directed rearwardly away from front wall 32 by the inclined surfaces 47 and 48 to further preclude splashing of the water to forwardly of the front wall during the delivery operation.

The side walls 33 and 34 may, as shown in FIGURE 3, be rounded in their forward portions 43a and 44a, respectively, to turn inwardly in joining with front wall 32, thereby further smoothening agitated flow resulting from the pouring of the water onto the bottom wall 31.

Thus, when the user wishes to brew coffee or the like in apparatus 10, he merely places a suitable quantity of brew ingredient, such as coffee C, in the cartridge 22 and places the cartridge in position within the housing 11, as shown in FIGURE 1. He then may move the drawer 24 forwardly from the retracted position of FIGURE 1 to provide access to the drawer space 35. After filling the decanter D with a suitable quantity of cold water corresponding to the desired quantity of coffee, he may quickly pour the cold water from the decanter into the tray 24. By virtue of the improved splash preventing construction of the drawer, the water may be poured at a high delivery rate without causing splashing thereof forwardly from the drawer. Upon emptying the decanter, the user may then place the decanter in the brew receiving position of FIGURE 1 subjacent the cartridge. The cold water flowing from the drawer 24 into basin 26 and downwardly therefrom through tube 27 into lower tank portion 28 displaces a corresponding quantity of previously heated water through the outlet 19 and into the cartridge 22. After a short period wherein the coffee grounds are wetted by the hot water, brewed beverage flows outwardly through the opening 23 into the decanter. When the quantity of hot water corresponding to the quantity of cold water poured into the drawer 24 is delivered into the cartridge 22, further delivery of hot water is effectively terminated to complete the hot water delivery operation.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a brewing apparatus having a water heating tank provided with an inlet receiver, means for conducting poured water to said inlet receiver comprising a shallow drawer having a bottom wall and upstanding side and front walls defining a rearwardly open water receiving space disposed to deliver water rearwardly therefrom into the inlet receiver, and baffle means on said front wall spaced above said bottom wall and extending rearwardly from said front wall for effectively precluding the splashing forwardly from said drawer of water poured into said space and effectively assuring the delivery of substantially all water poured into said space rearwardly therefrom into said inlet receiver.

2. The brewing apparatus of claim 1 further including baffle means on said side walls spaced above said bottom wall and extending inwardly therefrom.

3. The brewing apparatus of claim 1 wherein said baffle means comprises an inturned flange on the upper edge of said front wall.

4. The brewing apparatus of claim 1 further including means defining a concave rounded rearwardly facing connection between said bottom wall and said front wall for directing water moving forwardly of said bottom wall upwardly along the rear surface of said front wall and against the underside of said baffle means to be redirected thereby rearwardly into said receiving space.

5. The brewing apparatus of claim 4 further including means defining a concave rounded rearwardly facing connection between said front wall and said baffle means for directing water moving upwardly along the rear face of said front wall rearwardly along the underside of said baffle means.

6. The brewing apparatus of claim 1 further including baffle means on said side walls spaced above said bottom wall and extending inwardly therefrom at least approximately 5% of the width of said bottom wall.

7. The brewing apparatus of claim 1 wherein said baffle means extends from said front wall at least approximately 10% of the depth of said bottom wall.

8. The brewing apparatus of claim 1 wherein said bottom wall is inclined rearwardly downwardly to direct poured water splashing upwardly from said bottom wall rearwardly away from said front wall.

9. The brewing apparatus of claim 1 wherein said baffle means has a rearward extent similar to the upright extent of said front wall above said bottom wall.

10. The brewing apparatus of claim 1 further including baffle means on said side walls spaced above said bottom wall and extending inwardly therefrom, said front wall and side wall baffle means comprising a continuous inturned flange on the upper edge of said front and side walls.

References Cited

UNITED STATES PATENTS

| | | | |
|---|---|---|---|
| 2,782,706 | 2/1957 | Colonna | 99—315 |
| 3,034,418 | 5/1962 | Bunn | 99—323 |
| 3,220,334 | 11/1965 | Martin | 99—282 |
| 3,261,279 | 7/1966 | Kaplan | 99—282 |
| 3,366,034 | 1/1968 | Karlen | 99—282 |

ROBERT W. JENKINS, *Primary Examiner.*